United States Patent
Thomas et al.

(10) Patent No.: US 6,526,240 B1
(45) Date of Patent: Feb. 25, 2003

(54) VERSATILE SYSTEM FOR CREATING TEST IMAGES IN A DIGITAL PRINTING APPARATUS

(75) Inventors: Michael J. Thomas, Penfield, NY (US); Joseph W. Ward, Pittsford, NY (US); Hung M. Pham, Torrance, CA (US); Daniel D. Truong, Lawndale, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/941,207

(22) Filed: Aug. 28, 2001

(51) Int. Cl.[7] ............................................. G03G 15/00
(52) U.S. Cl. ...................................................... 399/72
(58) Field of Search ............................. 399/38, 46, 49, 399/72, 301, 81; 347/19, 116, 133

(56) References Cited

U.S. PATENT DOCUMENTS

| | | | |
|---|---|---|---|
| 5,450,165 A | 9/1995 | Henderson | 399/46 |
| 5,652,946 A | 7/1997 | Scheuer et al. | 399/49 |
| 5,826,139 A * | 10/1998 | Nacman et al. | 399/72 |
| 6,021,288 A * | 2/2000 | Okuno et al. | 399/72 |
| 6,100,907 A * | 8/2000 | Uffel | 347/133 |
| 6,167,217 A | 12/2000 | Kelsch et al. | 399/72 |
| 6,204,869 B1 * | 3/2001 | Raker et al. | 399/72 X |

* cited by examiner

*Primary Examiner*—Hoan Tran
(74) *Attorney, Agent, or Firm*—R. Hutter

(57) ABSTRACT

In a digital printing apparatus, such as a xerographic or ink-jet printer, test marks, such as halftone patches or fiducial marks for image registration, are generated on demand. Coordinates of a desired location of the test mark within an imageable area (such as on a print sheet or on a photoreceptor), as well as a selection of the desired type of test mark, are entered through a user interface. Also entered is data about conditions under which image-quality tests using the test marks are to be performed. Information about the test mark and test conditions is retained as a small number of scalar values. The system enables test methods for a machine to be changed easily, and a basic set of system software can be readily applied to different types of printing hardware.

28 Claims, 3 Drawing Sheets

VERSATILE SYSTEM FOR CREATING TEST IMAGES IN A DIGITAL PRINTING APPARATUS

CROSS-REFERENCE TO RELATED APPLICATION

Cross-reference is made to the following co-pending patent application: U.S. patent application Ser. No. 09/662,197, filed Sep. 14, 2000, entitled "Color Printing Image Bearing Member Color Registration System," assigned to the assignee hereof, and allowed but not issued as of the filing hereof.

FIELD OF THE INVENTION

The present invention relates to digital printing systems, such as those using xerography, and in particular relates to a system for creating various types of test images as desired, for uses incidental to a printing process.

BACKGROUND OF THE INVENTION

In digital printing, digital image relating to an image desired to be printed is retained in a computer. The data is then processed in various ways, such as by decompression, decomposition (such as from a "page description language" or other format), and/or otherwise prepared for the direct operation of printing hardware. With a xerographic "laser printer," one or more lasers are modulated over time according to the image data to imagewise discharge a charge receptor to create the desired image; with an ink-jet printing apparatus, the image data is ultimately used to activate ink-jet ejectors to create the desired image.

Incidental to any type of digital printing may be a need to have the printing hardware create specialized images, which will here be called "test marks" but are typically called "test patches" or "test patterns," for objective evaluation. Such test patches may include patches of certain halftone values, patterns of certain configurations, such as spaced lines, chevrons, or bull's eyes, or combinations of colors. These test patches may be made on sheets such as of a type of sheet on which regular output is made, or, particularly in xerography, made only on the charge receptor and cleaned off. The test patches are typically measured and evaluated by optical test equipment, such as an optical densitometer or colorimeter within a printer itself. In xerography such test patches on a charge receptor can be tested for electrostatic properties, such as with an electrostatic voltmeter. Measurements of actual test patches made by the test equipment or by integral sensing means within the printer can then be fed into control systems which oversee and control print quality. Typically, the test patterns or patches generated by printer control software together with automatic sensing means, and automatic control algorithms are utilized to control and adjust internal printer activators for process control functions. All these elements cooperate to form automatic closed loop process control requirements.

Another type of specialized image useful in digital printing of any type is "registration" or "fiducial" marks, which have the function of facilitating optical tests and measurement of image placement, particularly the registration of multiple, superimposed color separations. Such registration marks are, for purposes of the present application, "test marks" as well.

In the prior art, mechanisms, particularly software mechanisms, for creation of test patches are typically dedicated to the particular hardware design of a printer. Typically, test patches can be created only of a particular type (such as predetermined halftone screens) and in certain fixed locations (such as in interdocument zones on a charge receptor), given a particular machine design; to change these parameters of test patches would typically require significant changes in the hardware and the software of the printer. Another possible technique for generation of test patches of a predetermined type would be to send to the printer image data, through the standard channel for receiving document data, including test patches of a desired type and in a desired location; however, this technique has practical disadvantages, such as consumption of memory and interruptions to the flow of data for images desired to be printed, thereby degrading performance and reliability of the printer.

The present invention relates to a versatile system for creating test patches of various types and in various locations on demand, in a manner which minimizes system image data memory use and which operates in an independent parallel data path, which is applicable to various types of printing hardware.

DESCRIPTION OF THE PRIOR ART

U.S. Pat. No. 5,450,165 describes a system in which image data associated with images desired to be printed is polled for areas which are incidentally usable as test patches.

U.S. Pat. No. 5,652,946 discloses a system for placing test patches in interdocument zones in a xerographic printer. The system uses timing values associated with different-sized images being printed to determine locations of interdocument zones.

U.S. Pat. No. 6,167,217 discloses a system which determines when test patches should be generated and tested, based on activities of the control system of the printer.

U.S. patent application Ser. No. 09/662,197, filed Sep. 14, 2000, entitled "Color Printing Image Bearing Member Color Registration System," assigned to the assignee hereof, and allowed but not issued as of the filing hereof (and therefore not prior art), gives a general overview of a fiducial-mark registration system in the context of an image-on-image xerographic color printer.

SUMMARY OF THE INVENTION

According to one aspect of the present invention, there is provided a method of operating a printing apparatus, comprising the steps of entering, through a user interface associated with the printing apparatus, data relating to a desired location of a test mark within an imageable area; and causing the printing hardware to place the test mark in the imageable area.

According to another aspect of the present invention, there is provided a method of operating a printing apparatus, comprising the steps of reading, from a memory, data relating to a desired location for a test mark within an imageable area; determining a real-time opportunity for creating the test mark at the desired location within the imageable area; and causing the printing apparatus to create the test mark at the desired location when an opportunity for creating the test mark at the desired location within the imageable area is determined.

According to another aspect of the present invention, there is provided an apparatus for digital printing, comprising a memory for retaining data relating to a desired location of a test mark within an imageable area; counting means for determining a condition for printing at the desired location within the imageable area; and image generating means for causing the printing apparatus to create the test mark at the desired location.

DETAILED DESCRIPTION OF THE INVENTION

Figure 1:
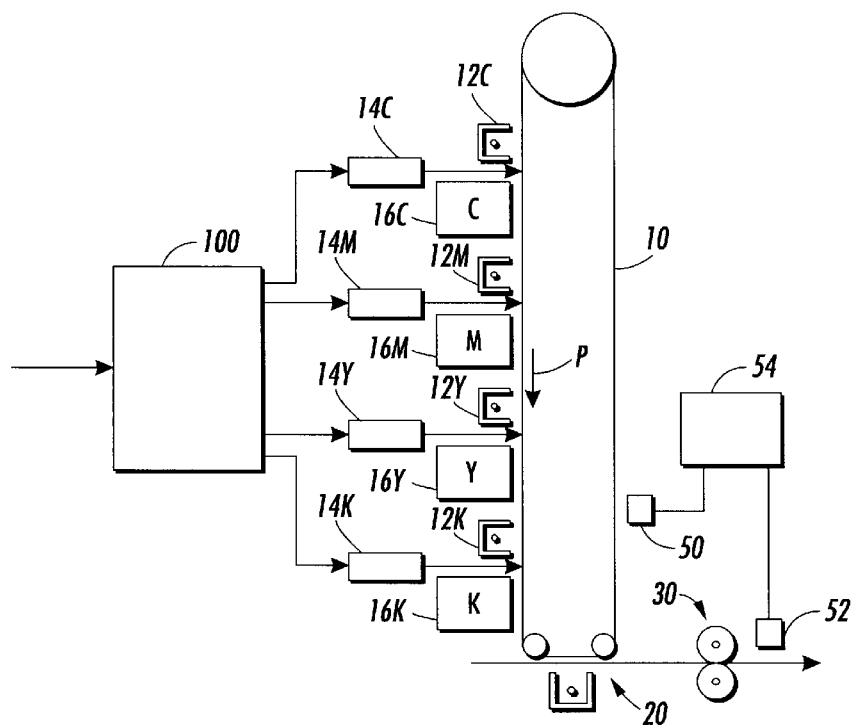
FIG. 1 is a simplified elevational view of essential elements of a xerographic color printer, showing a context of the present invention.

FIG. 1 is a simplified elevational view of essential elements of a color printer, showing a context of the present invention. Specifically, there is shown an "image-on-image" xerographic color printer, in which successive primary-color images are accumulated on a photoreceptor belt, and the accumulated superimposed images are in one step directly transferred to an output sheet as a full-color image. Other types of printers, such as monochrome machines using any technology, machines which print on photosensitive substrates, xerographic machines with multiple photoreceptors, or ink-jet-based machines, can beneficially utilize the present invention as well.

Specifically, the FIG. 1 embodiment includes a belt photoreceptor 10, along which are disposed a series of stations, as is generally familiar in the art of xerography, one set for each primary color to be printed. For instance, to place a cyan color separation image on photoreceptor 10, there is used a charge corotron 12C, an imaging laser 14C, and a development unit 16C. For successive color separations, there is provided equivalent elements 12M, 14M, 16M (for magenta), 12Y, 14Y, 16Y (for yellow), and 12K, 14K, 16K (for black). The successive color separations are built up in a superimposed manner on the surface of photoreceptor 10, and then the combined full-color image is transferred at transfer station 20 to an output sheet. The output sheet is then run through a fuser 30, as is familiar in xerography.

Also shown in the Figure is a set of what can be generally called "monitors," such as 50 and 52, which can feed back to a control device 54. The monitors such as 50 and 52 are devices which can make measurements to images created on the photoreceptor 10 (such as monitor 50) or to images which were transferred to an output sheet (such as monitor 52). These monitors can be in the form of optical densitometers, calorimeters, electrostatic voltmeters, etc. There may be provided any number of monitors, and they may be placed anywhere in the printer as needed, not only in the locations illustrated. The information gathered therefrom is used by control device 54 in various ways to aid in the operation of the printer, whether in a real-time feedback loop, an offline calibration process, a registration system, etc.

Typically, a printer using control systems which rely on monitors such as 50, 52 require the deliberate creation of what shall be here generally called "test marks" which are made and subsequently measured in various ways by one or another monitor. These test marks may be in the form of test patches of a desired darkness value, a desired color blend, or a particular shape, such as a line pattern; or they may be of a shape particularly useful for determining registration of superimposed images ("fiducial" or "registration" marks). Various image-quality systems, at various times, will require test marks of specific types to be placed on photoreceptor 10 at specific locations. These test marks will be made on photoreceptor 10 by one or more lasers such as 14C, 14M, 14Y, and 14K. As is familiar in the art of "laser printing," by coordinating the modulation of the various lasers with the motion of photoreceptor 10 and other hardware (such as rotating mirrors, etc., not shown), the lasers discharge areas on photoreceptor 10 to create the desired test marks, particularly after these areas are developed by their respective development units 16C, 16M, 16Y, 16K. The test marks must be placed on the photoreceptor 10 in locations where they can be subsequently measured by a (typically fixed) monitor elsewhere in the printer, for whatever purpose.

The present invention is directed toward a versatile system for causing the printing hardware to create test marks of desired types, in desired locations on the photoreceptor 10 or on an output sheet, on demand.

Figure 2:
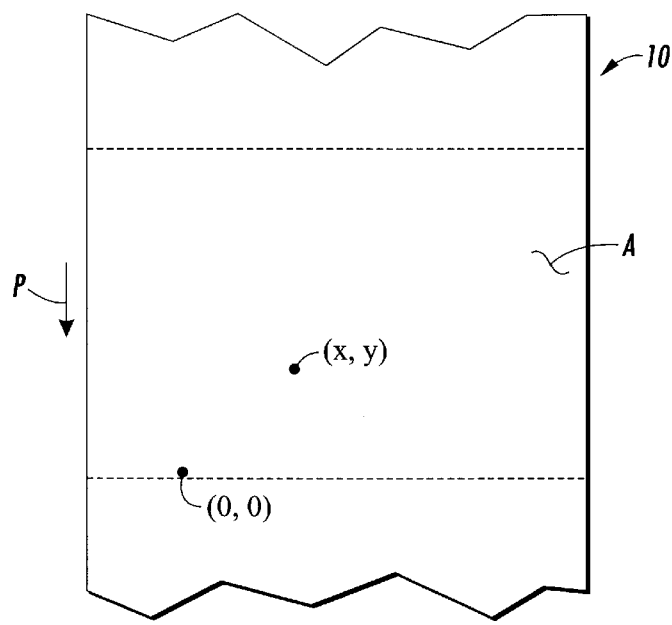
FIG. 2 is a plan view of a portion of photoreceptor, illustrating a principle related to the present invention.

Prefatory to a description of an embodiment of the present invention, a description of a context of the claimed invention is given. FIG. 2 is a plan view of a portion of photoreceptor 10. Within a printer such as shown in FIG. 1, the photoreceptor 10 will move in a process direction P. At any arbitrarily chosen location on the photoreceptor 10, there can be considered what is called an "imageable area" indicated as A. This imageable area may, but need not, correspond in some way to an area on which an image desired to be printed is placed (including a predetermined interdocument zone); it may, but need not, correspond to one or another physical "landmark" formed in or on photoreceptor 10, such as a seam or hole; indeed, the entire surface of the photoreceptor 10 may be considered the imageable area. However, the imageable area must define relative thereto an "origin" point, such as shown as (0, 0) in FIG. 2, from which any other point within the imageable area can be located, such as shown as (x, y). The coordinate system thus enabled can facilitate locating a desired test mark essentially anywhere in the imageable area.

(In a printing apparatus wherein there is no image receptor or intermediate surface for creating an image, such as a direct-to-medium ink-jet printer, or an apparatus which uses photosensitive film or paper, the imageable area can be the area of a special print sheet which is occasionally output by the apparatus.)

In a practical application of the present invention, the numbers to be associated with the (x, y) coordinate system relative to an origin correspond to a number of pixels, the printer being capable of outputting prints at a predetermined resolution (i.e., pixels per inch). For example, in a printer designed with a 600 ppi resolution, if the x dimension is considered orthogonal to process direction P, a location of (600, 1200) would be one inch to the side and two inches "downstream" of the origin in the process direction. The advantage of the pixel convention is that counters within the software and hardware of the printer can be easily adapted to conform to data flows within the printer, as will be apparent below.

Figure 3:
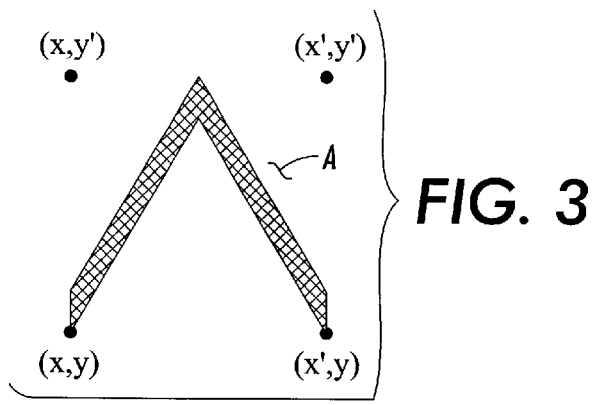
FIGS. 3–5 show example test marks and their respective relationships with a coordinate set, illustrating a principle related to the present invention.
Figure 4:
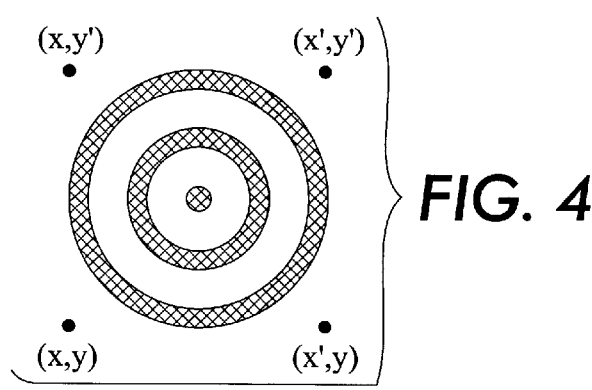
Figure 5:
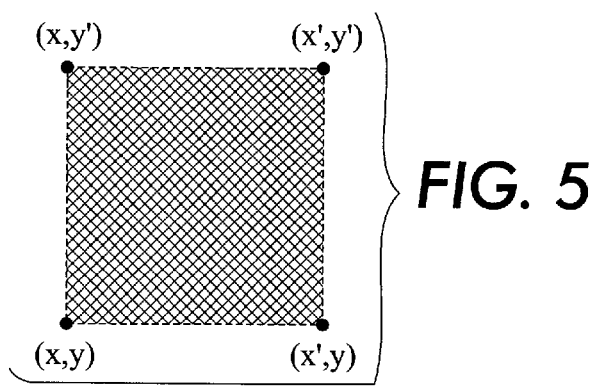

FIGS. 3–5 show example test marks and their respective relationships with a coordinate set (x, y): in these examples, the test marks take up the area within a set of coordinates (x,y), (x',y), (x,y'), (x',y'), as shown. FIG. 3 shows a chevron, such as typically used in registration systems, and FIG. 4 shows a bull's eye pattern. FIG. 5 shows how a test mark in the form of a patch can be created of any size and location within the imageable area by defining the patch area as the area within a set of four coordinates as shown. As will be described in detail below, once the boundaries of the patch area are thus defined in the coordinate system, another utility within the system can request filling in the area with a bitmap of desired mark, or with an area of a desired image darkness, or with any desired "halftone" or "dither" pattern or other intended object or pattern.

Figure 6:
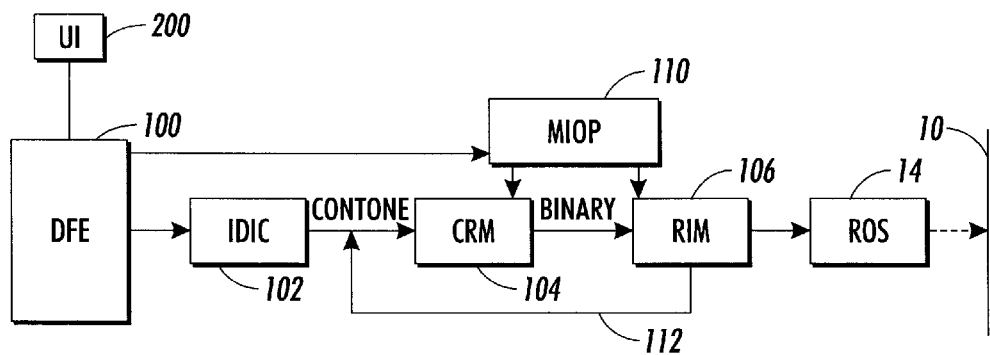
FIG. 6 is a systems diagram showing an embodiment of the present invention within a typical digital printing architecture.

FIG. 6 is a systems diagram showing an embodiment of the present invention within a typical digital printing architecture. FIG. 6 illustrates a single "channel" for image data, such as would be used by itself in a monochrome printer, or as one channel among many, one channel for each primary color, in a full-color system. Although the output of the illustrated embodiment is the laser 14 such as described above, the invention can be readily applied to other image modulating devices, such as LED bars, LCD arrays, etc, or to other printing technologies, such as ink-jet, etc.

In the FIG. 6 embodiment, image data is accepted, stored, produced, decomposed or otherwise presented at a digital front end, or DFE, indicated as 100, which is also shown in FIG. 1. DFE 100 accepts data for images desired to be printed in any one of a number of possible formats, such as, for example, TIFF, JPEG, or Adobe® PostScript™. This image data is then "interpreted" or "decomposed" in a known manner into a format usable by downstream circuitry and software. The decomposed data is first applied to an image data interface card (IDIC) 102; the output of IDIC 102 is, where required, what is commonly called "contone" ("continuous tone") data concerning specific locations, or pixels in the desired image. In general, contone data can be defined as a scalar number (such as from 0 to 255) symbolic of the desired darkness of the particular indicated area in the image. This contone data is then sent to what is called a "contone rendering module," or CRM, 104. As is known in the art, most currently-popular digital printing technologies, such as xerography and ink jet, are in effect "binary" at the pixel level: any particular pixel can be only black (or saturated in a color) or not-black (no color). In order to obtain a halftone or gray area, the contone data must be converted to a screen or other "halftone" pattern, which, over an area slightly larger than the pixel level, approximates the desired darkness. This conversion is performed by CRM 104. The output of CRM 104 is binary data which, by itself, is largely directly operative of hardware, such as to modulate an imaging laser or activate an ink-jet ejector within a printhead at a particular time.

The binary data from CRM 104 is typically passed through, in this case, a ROS (raster output scanner) interface module, or RIM, indicated as 106. The RIM reorganizes and synchronizes the binary image data for synchronous delivery to the laser 14 in cooperation with, for example, the motion of photoreceptor 10.

In addition to the basic image path elements described above, there is included, in the present embodiment, part of the master printer controller, what is called a marker I/O processor, or MIOP, 110. MIOP 110 is connected to the electronic circuitry (ASICS or printed circuit boards) forming CRM 104 and RIM 106, with controlling, messaging, and data passing means, such as through a VME32 bus 114; it in turn may receive instructions from DFE 100 by way of alternate communication channel 116. According to the illustrated embodiment, instructions to create test marks on demand at a location within the imageable area can be submitted to CRM 104 and RIM 106 via MIOP 110.

According to some aspects of the present invention, in its typical operation, there can be printed on demand, at a predetermined location within the imageable area, any of three types of test marks: bitmap patterns, such as shown above as FIG. 3 or 4; line patterns; or otherwise, test patches having target densities, such as shown at FIG. 5. Given the stated general function of the RIM 106, it will be noted that, in outputting any image onto photoreceptor 10 or onto an output sheet, the RIM 106 must in effect maintain a count of every pixel area in the imageable area, in two dimensions. In other words, over time (such as the active scan period of the laser 14 when laser within 14 has an opportunity to discharge every single pixel area in the imageable area), the RIM 106 must keep track of the (x, y) coordinates of the laser in real time in order to determine whether or not to activate the laser according to the image data desired to be printed. One embodiment of the invention exploits this two-dimensional "running count" of pixel areas to enable creation of test marks in a desired location using a very small amount of memory.

According to the present embodiment of the invention, information relating to attributes of a desired test mark, such as the location, size, target darkness, and configuration of the mark can be stored as a few scalar numbers in a small number of registers, such as in functional logic circuits in the ASIC forming an essential part of the RIM 106. The scalar numbers relating to the location and size of the test mark are stored simply as one or more sets of (x, y) coordinates, either for a bitmap, such as in FIG. 3 or 4 above, or defining boundaries of a patch, as shown above in FIG. 5. During operation of the printer (although not necessarily during printing of a desired image) the RIM must count through all of the pixel locations as, for instance, the laser 14 has an opportunity to expose them. Defining a location of a desired test mark is simply a matter of setting up a relationship of each pixel in the imageable area with the defined test mark location.

The test mark area is defined easily as the area (x, y)<pixel<(x', y) AND (x, y)<pixel<(x, y'). In this range, a contone value of the desired image density is output. As the series of pixels in two dimensions is counted through by the RIM 106, the running count can be constantly compared to these mathematically defined boundaries: when the mathematical relationship holds "true", and there is thus a real-time opportunity to print a portion of the desired test mark in the desired location in the imageable area, image data relating to the desired test mark is sent on to laser 14.

For test marks of a shape which can be summarized in a small amount of bitmap data, such as the chevron of FIG. 3 or the bull's eye of FIG. 4, this small amount of bitmap data can be substituted for the binary pixel data in the test mark area. Depending on the nature of the bitmap data, the data can be stored within RIM 106 or readily accessed from another memory (such as within MIOP 110) and "downloaded" into the RIM 106 when required, prior to synchronous delivery to the laser 14 for printing.

For test marks of a simple configuration, such as chevrons, T-shapes, Z-shapes, etc., it is often possible to exploit rendering features within the image path to define such marks with very small amounts of data. Very often the image path may include rendering means by which, for instance, a line can be characterized by a small number of scalar parameters (length, thickness, x- or y-orientation), which, when passed through the rendering means, causes the RIM 106 to output the line according to the parameters. These scalar parameters, which can be retained in registers within RIM 106 or MIOP 110, consume trivial amounts of memory.

Another type of test mark, which is common in the xerographic printer context, includes a series of narrow lines, either parallel or perpendicular to process direction P as shown in FIG. 2. Such a plurality of lines can be rendered, such as by using the rendering means described above which are incidental to the image path, by further using a scalar number symbolic of repeating a defined line, such as in the x or y direction.

For test marks in the form of contone test patches, such as shown in FIG. 5, once the test mark area is defined, a scalar number symbolic of the desired darkness level of the test patch (such as from 0 to 255) is stored in a register: this is the only number that need be retained to characterize the darkness level. This scalar number is, in the illustrated embodiment, merely fed back, such as through data path 112, to the CRM 104. When the test patch is being made, i.e., within defined test patch boundaries, the CRM 104 does its customary job of converting the scalar contone number to binary information for printing at the pixel level.

Also shown in FIG. 6 is a user interface, or UI, indicated as 200. Standard DFE's typically have some sort of UI utility for their various functions; one feature enabled by the present invention is the user setup, programming, or modifying of types and locations of, as well as times and occasions for using, test marks. (In this context a "user" can be a person with special privileges relative to a machine, such as a systems administrator, a printer operator, or a representative of a machine manufacturer.) In the prior art, the types and locations of test marks are fixed with respect to a particular hardware design. With the present invention, however, a user can, at any time, enter coordinates of a desired location of a test mark, as well as select the type of test mark.

The user can further enter, through UI 200, one or more specific conditions (for example, time interval, power-up, and/or sequence of test work with respect to number of prints, etc.) for an image-quality test requiring a certain kind of test mark to be produced. These selections can be made at any time through the user interface provided with the DFE 100, or through an alternate user interface associated with another aspect of the machine, e.g. there may be provided, for example, a special user interface, independent of the DFE, specially accessible to a hardware technician. During operation of the machine, software and/or hardware means can determine when the conditions for creating the test mark are met, e.g., detecting a power-up or submission of a print job, detecting a change in ambient temperature or humidity, counting a number of prints made or revolutions of the photoreceptor 10, or consulting a clock so that, for instance, tests are carried out every hour. When the entered conditions are met, the entered tests, requiring a particular set of types of test mark, are carried out. Different types of tests (registration, color fidelity, etc.) can be determined to be carried out at different times and under different conditions: for instance, registration tests may be wished to be carried out more often than color-blending tests. By enabling selections of test methods and conditions to be made via a user interface, a basic software package for creating and locating test marks can be easily adapted for different test methods, and even for different machine designs.

Figure 7:
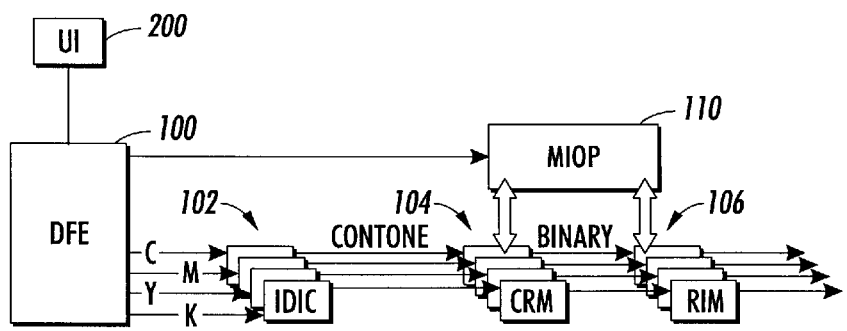
FIG. 7 is a systems diagram showing an embodiment of the present invention within a typical full-color digital printing architecture.

The image path shown in FIG. 6 is, as previously mentioned, suitable for a monochrome printer, or for a single color separation in a full-color printer. In a color embodiment of the present invention, there is provided a plurality of such channels as shown in FIG. 6; an implementation of such a color version is shown in FIG. 7. As can be seen, the various elements shown in the image path of FIG. 6 are replicated for each primary color; a single MIOP 110 can interact with the DFE 100 to coordinate activities of each image path.

The full-color embodiment of the present invention presents some special capabilities. For instance, it may be desired to create and measure test patches comprising colorants of two or more primary colors, such as to test a color blending system. To do so, contone test patches, each defined and created as described above, corresponding to the two or multiplicity of primary colors are created to be superimposed on (in the FIG. 1 embodiment) the same location of the photoreceptor 10.

Figure 8:
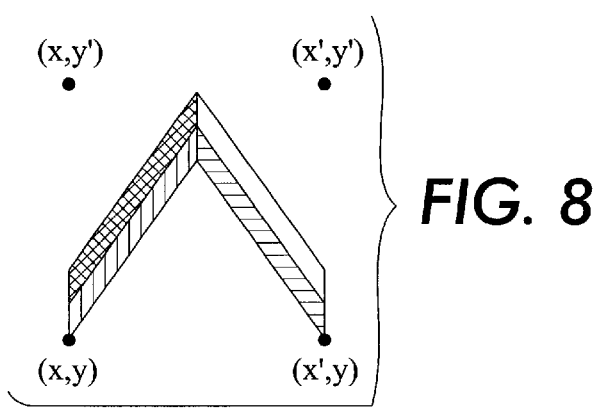
FIG. 8 is an example test mark as would be made, for instance, in a typical full-color digital printing architecture.

For using test marks for color-separation registration purposes, typically registration test marks of different primary colors are desired to be placed very close to each other. An example of the general technique is given in the patent application cross-referenced above, but an example of a combination test mark, comprising test marks of different primary colors (represented by different types of shading), is shown as FIG. 8. The test mark is typically of a size corresponding to a registration mark monitor, such as 50, 52 in FIG. 1, such as about 250 pixels in width as shown in FIG. 8. In the registration application, it is typical that two or more monitors, such as 50*a*, 50*b* in FIG. 2., may be placed across the photoreceptor 10 to enable registration to be tested.

In summary, the present invention provides a versatile system for placing test marks of any of a number of selectable types at any location and at a multiplicity of locations in an imageable area. As such, a basic set of hardware and/or software embodying the present invention can be applied to various kinds of digital printing apparatus, and adapted to automatic printer image-quality and registration control systems, and to image-quality-testing needs by a simple entry of a small number of necessary parameters. As a particular printing apparatus is altered over time, desired changes in a testing scheme can similarly be accommodated by changing the input parameters.

What is claimed is:

1. A method of operating a printing apparatus, comprising the steps of:

entering, through a user interface associated with the printing apparatus, data relating to at least one of a desired appearance and a desired location of a test mark within an imageable area;

entering, through the user interface associated with the printing apparatus, data relating to a condition for creating the test mark within the imageable area; and causing the printing apparatus to create the test mark when the condition is met.

2. The method of claim 1, further comprising the step of entering, through the user interface, a selection of a type of test mark.

3. The method of claim 1, wherein the data relating to an appearance of the test mark comprises data relating to a bitmap.

4. The method of claim 1, wherein the data relating to an appearance of the test mark comprises a parameter relating to an attribute of at least one line.

5. The method of claim 1, wherein the data relating to an appearance of the test mark comprises a parameter relating to repetition of the test mark within the imageable area.

6. The method of claim 1, wherein the data relating to an appearance of the test mark comprises a parameter relating to a desired darkness of the test mark.

7. The method of claim 6, further comprising the step of generating a halftone pattern relating to the desired darkness of the test mark.

8. The method of claim 1, wherein the user interface permits entry of a condition relating to power-up.

9. The method of claim 1, wherein the user interface permits entry of a condition relating to submission of a print job.

10. The method of claim 1, wherein the user interface permits entry of a condition relating to at least one of ambient temperature or humidity.

11. The method of claim 1, wherein the user interface permits entry of a condition relating to counting a number of prints made.

12. The method of claim 1, wherein the user interface permits entry of a condition relating to a predetermined time interval.

13. The method of claim 1, wherein the step of entering a condition includes entering a first condition and a second condition.

14. An apparatus for digital printing, comprising:
a memory for retaining data relating to a desired location of a test mark within an imageable area;
a user interface for receiving data relating to the desired location of the test mark and data relating to a condition under which the test mark is placed in the imageable area;
counting means for detecting the condition for printing at the desired location within the imageable area; and
image generating means for causing the printing apparatus to create the test mark at the desired location.

15. The apparatus of claim 14, further comprising a memory for retaining data relating to an appearance of the test mark.

16. The apparatus of claim 15, wherein the data relating to an appearance of the test mark comprises a bitmap.

17. The apparatus of claim 15, wherein the data relating to an appearance of the test mark comprises a parameter relating to an attribute of at least one line.

18. The apparatus of claim 15, wherein the data relating to an appearance of the test mark comprises a parameter relating to repetition of the test mark within the imageable area.

19. The apparatus of claim 15, wherein the data relating to an appearance of the test mark comprises a parameter relating to a desired darkness of the test mark.

20. The apparatus of claim 19, further comprising means for generating a halftone pattern in response to receiving the parameter relating to the desired darkness of the test mark.

21. The apparatus of claim 14, further comprising a user interface for receiving data relating to the appearance of the test mark.

22. The apparatus of claim 14, further comprising printing hardware.

23. The apparatus of claim 14, wherein the user interface permits entry of a condition relating to power-up.

24. The apparatus of claim 14, wherein the user interface permits entry of a condition relating to submission of a print job.

25. The apparatus of claim 14, wherein the user interface permits entry of a condition relating to at least one of ambient temperature or humidity.

26. The apparatus of claim 14, wherein the user interface permits entry of a condition relating to counting a number of prints made.

27. The apparatus of claim 14, wherein the user interface permits entry of a condition relating to a predetermined time interval.

28. The apparatus of claim 14, wherein the user interface permits entry of a first condition and a second condition.

* * * * *